(12) United States Patent
Littell

(10) Patent No.: US 9,302,567 B1
(45) Date of Patent: Apr. 5, 2016

(54) SAFETY BARRIER FOR VEHICLES

(76) Inventor: Susan Diane Littell, Alachua, FL (US)

( * ) Notice: Subject to any disclaimer, the term of this patent is extended or adjusted under 35 U.S.C. 154(b) by 74 days.

(21) Appl. No.: 12/724,148

(22) Filed: Mar. 15, 2010

Related U.S. Application Data

(60) Provisional application No. 61/210,232, filed on Mar. 16, 2009.

(51) Int. Cl.
  B60J 1/20 (2006.01)
(52) U.S. Cl.
  CPC .................................... B60J 1/2011 (2013.01)
(58) Field of Classification Search
  USPC ................ 160/368.1, 351, 350, 354, 370.21,
       160/DIG. 1, DIG. 2, DIG. 3; 296/24.43, 24.4,
       296/24.41, 187.05; 280/748, 751; 119/712
  See application file for complete search history.

(56) References Cited

U.S. PATENT DOCUMENTS

| 606,332 | A | * | 6/1898 | Cummins | 150/154 |
|---|---|---|---|---|---|
| 2,706,819 | A | * | 4/1955 | McClure | 5/94 |
| 3,150,640 | A | * | 9/1964 | Nevitt | 119/712 |
| 3,266,560 | A | * | 8/1966 | Mooskian | 160/368.1 |
| 3,480,069 | A | * | 11/1969 | Handwerker | 160/354 |
| 3,537,688 | A | * | 11/1970 | Stein | 135/95 |
| 3,546,721 | A | * | 12/1970 | Cleary | 5/97 |
| 3,771,808 | A | * | 11/1973 | Duerst | 280/19 |
| 4,046,393 | A | * | 9/1977 | Vadnais | 280/19 |
| 4,100,957 | A | * | 7/1978 | Shelton | 160/368.1 |
| 4,446,944 | A | * | 5/1984 | Forrest et al. | 182/3 |
| 4,618,026 | A | * | 10/1986 | Olson | 182/4 |
| 4,796,567 | A | * | 1/1989 | Allan et al. | 119/678 |
| 4,818,007 | A | * | 4/1989 | Mahoney | 296/24.41 |
| 4,842,035 | A | * | 6/1989 | Thompson | 160/135 |
| 4,852,194 | A | * | 8/1989 | Langan | 5/427 |
| 4,924,814 | A | * | 5/1990 | Beaudet | 119/712 |
| 5,010,943 | A | * | 4/1991 | Boyer | 160/351 |
| 5,113,981 | A | * | 5/1992 | Lantz | 188/371 |
| 5,309,866 | A | * | 5/1994 | Santoro | 119/650 |
| 5,327,993 | A | * | 7/1994 | Stark, Sr. | 182/129 |
| 5,474,329 | A | * | 12/1995 | Wade et al. | 280/749 |
| 5,517,707 | A | * | 5/1996 | LaMantia | 5/97 |
| 5,529,321 | A | * | 6/1996 | Thompson | 280/19 |
| 5,570,735 | A | * | 11/1996 | Chu | 160/370.23 |
| 5,768,722 | A | * | 6/1998 | Olson et al. | 5/9.1 |
| 6,017,043 | A | * | 1/2000 | Bennett et al. | 280/18 |
| 6,394,039 | B1 | * | 5/2002 | Grauer | 119/712 |
| 6,565,101 | B2 | * | 5/2003 | Jones et al. | 280/19 |
| 6,581,545 | B1 | * | 6/2003 | Foster | 119/482 |
| 6,695,373 | B1 | * | 2/2004 | Meise | 296/24.43 |
| 7,318,392 | B2 | * | 1/2008 | Rosen et al. | 119/497 |

(Continued)

Primary Examiner — Katherine Mitchell
Assistant Examiner — Shiref Mekhaeil
(74) Attorney, Agent, or Firm — James Claus

(57) ABSTRACT

A versatile barrier within a vehicle improves safety while transporting pets. The versatility of the barrier applies to both its positioning and orientation within a single vehicle and its utilization in different types of vehicles. The barrier can be utilized vertically or horizontally, or some combination thereof, to confine a pet to an area in the vehicle away from the driver. Multiple attachment points allow the barrier to be adjusted to the shape necessary to create such separation. The multiple attachment points—on the barrier's perimeter and/or interior—create versatility and adjustability with respect to utilizing the barrier in various types of vehicles and creating multiple possible configurations within a single vehicle. Similarly, the combination of possible materials used for modes of attachment creates a barrier that can be utilized not only in various types of vehicles but also in multiple configurations within a single vehicle.

8 Claims, 9 Drawing Sheets

(56) References Cited

U.S. PATENT DOCUMENTS

| | | | |
|---|---|---|---|
| 7,461,485 B2 * | 12/2008 | Toledo | 52/222 |
| 7,775,251 B2 * | 8/2010 | Ward | 160/89 |
| 7,789,445 B2 * | 9/2010 | Hoffman et al. | 296/24.31 |
| 7,909,137 B2 * | 3/2011 | Green | 182/3 |
| D653,815 S * | 2/2012 | Wetherby | D30/119 |
| 8,251,121 B1 * | 8/2012 | Casey | 160/327 |
| 8,272,674 B2 * | 9/2012 | Vance | 296/24.46 |
| 8,333,392 B1 * | 12/2012 | Wolf et al. | 280/19 |
| 2004/0079586 A1 * | 4/2004 | Walls et al. | 182/138 |
| 2006/0107902 A1 * | 5/2006 | Rosen et al. | 119/497 |
| 2006/0169534 A1 * | 8/2006 | Green | 182/7 |
| 2006/0215940 A1 * | 9/2006 | May | 383/4 |
| 2006/0260047 A1 * | 11/2006 | Peterson et al. | 5/413 R |
| 2007/0138456 A1 * | 6/2007 | Clark | 256/24 |
| 2007/0144688 A1 * | 6/2007 | Grat | 160/370.21 |
| 2008/0136205 A1 * | 6/2008 | Hoffman et al. | 296/24.46 |
| 2010/0032108 A1 * | 2/2010 | Ward | 160/368.1 |
| 2010/0116447 A1 * | 5/2010 | Thompson | 160/368.1 |
| 2012/0018248 A1 * | 1/2012 | Green | 182/5 |
| 2012/0145208 A1 * | 6/2012 | Huber | 135/121 |

* cited by examiner

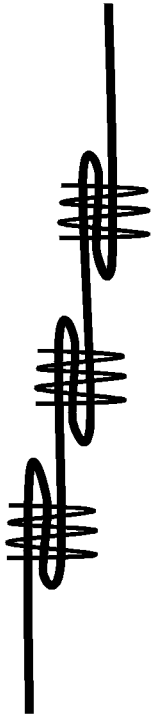

SAFETY BARRIER FOR VEHICLES

PRIORITY

The present application claims priority to U.S. Application 61/210,232 filed on Mar. 16, 2009, which is incorporated herein by reference in its entirety.

FIELD OF THE INVENTION

The present invention relates to auto safety and pet comfort while transporting animals, such as dog(s), cat(s), or other pets. The invention does not restrain the animal, rather it creates a barrier sequestering the animal safely away from the driver.

BACKGROUND

Pet owners struggle with creating a safe environment for transporting animals. With this in mind, the present invention focuses on sequestering the pet away from the driver (or other passengers) while in transport using a barrier. Unlike items in a similar field, the present invention does not focus on restraint. Of the few items presently available in commerce that create a "barrier", none of them are as versatile as the present invention. None of them are intended for use in multiple vehicle classes. None of them are adjustable in the sense that they can be used in multiple places within a single vehicle depending on need. None of them assemble and dissemble as quickly and easily, especially without adding any permanent "hardware" to the vehicle itself.

BRIEF SUMMARY OF THE INVENTION

The objective of the invention is to provide a barrier within a vehicle to improve safety while transporting pets. The barrier of the subject invention is versatile, completely adjustable, easy to use, quick to assemble and dissemble, and convenient to store when not in use.

The versatility of the barrier applies to both its positioning and orientation within a single vehicle and its utilization in different types of vehicles. The barrier can be utilized vertically or horizontally, or some combination thereof, to confine a pet to an area in the vehicle away from the driver. Multiple attachment points allow the barrier to be adjusted to the shape necessary to create such separation. The multiple attachment points—on the barrier's perimeter and/or interior—create versatility and adjustability with respect to utilizing the barrier in various types of vehicles and creating multiple possible configurations within a single vehicle. Similarly, the combination of possible materials used for modes of attachment creates a barrier that can be utilized not only in various types of vehicles but also in multiple configurations within a single vehicle. This degree of versatility and adjustability of the subject invention make it unique.

BRIEF DESCRIPTION OF THE DRAWINGS

FIG. 3 shows a top view of fabric folded into one or more Z-folds and stitched with low strength stitching to form a local-failure device.

FIG. 4 shows a top view of fabric folded into one or more T-folds and stitched with low strength stitching to form a local-failure device.

FIG. 7 depicts a variety of modes of attachment suitable to the invention.

FIG. 8 provides additional details relating to one embodiment of a Z-fold local-failure device.

DETAILED DESCRIPTION

The subject application describes a vehicle barrier that in one configuration may be used for separating the front seat area from the rest of the vehicle. More generally, the subject application describes a flexible or inflexible barrier having multiple attachment points that allow it to be secured between and at least partially dividing different areas of a vehicle.

The subject application describes a specific use for the barrier in confining animals, such as pets, to an area away from the driver. However, it should be understood that the embodiments of the subject invention are applicable to a variety of uses, including containing non-animal objects to an area away from the driver.

Figure 1:
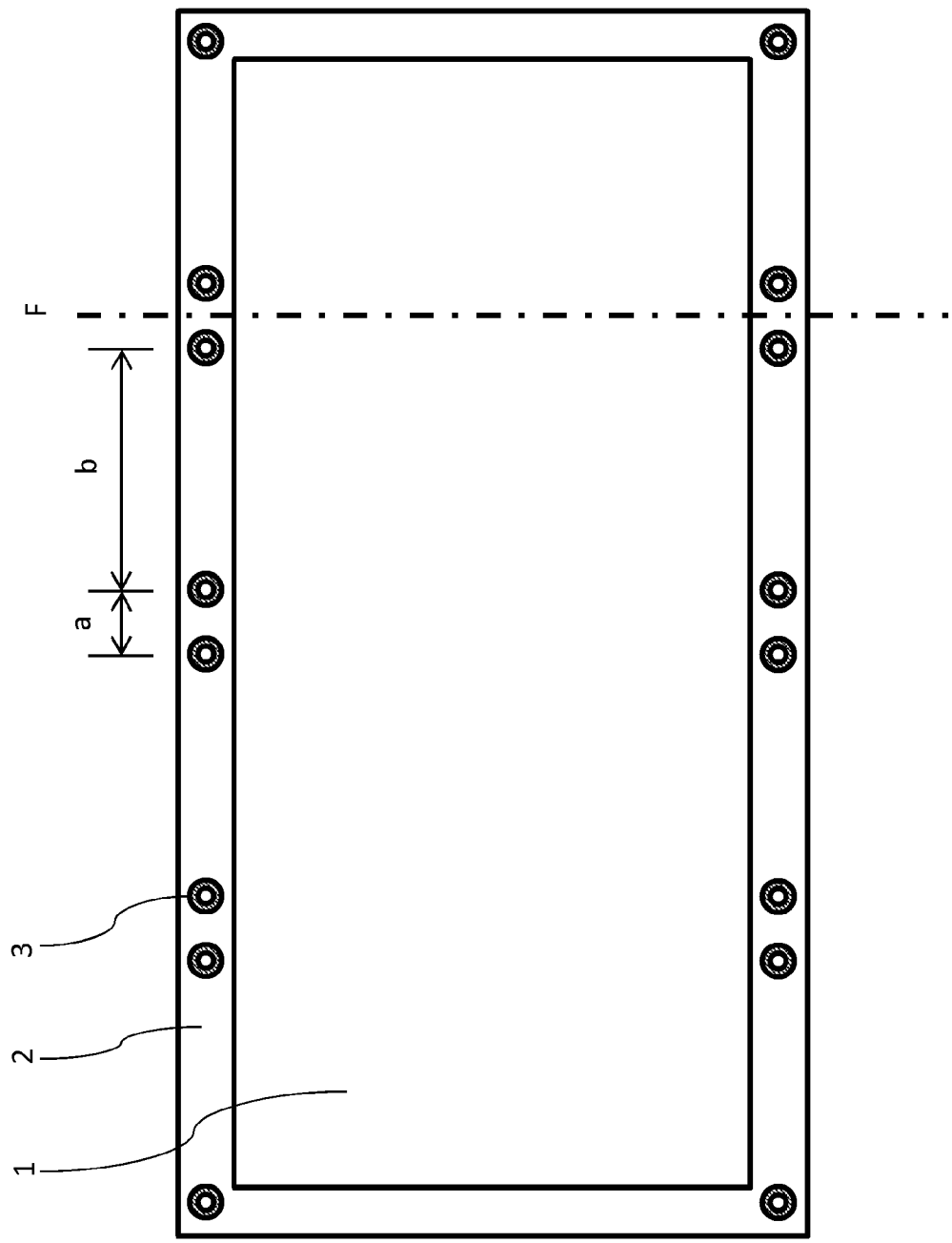
FIG. 1 depicts a barrier comprising a curtain 1, a reinforced periphery 2, and a number of grommets 3 located within the periphery. The grommets are arranged with alternating short spacings a and long spacings b. The dotted line F indicates a position along which the barrier could be folded to create a double curtain and allow perfect superpositioning of grommets upon folding.
Figure 2:
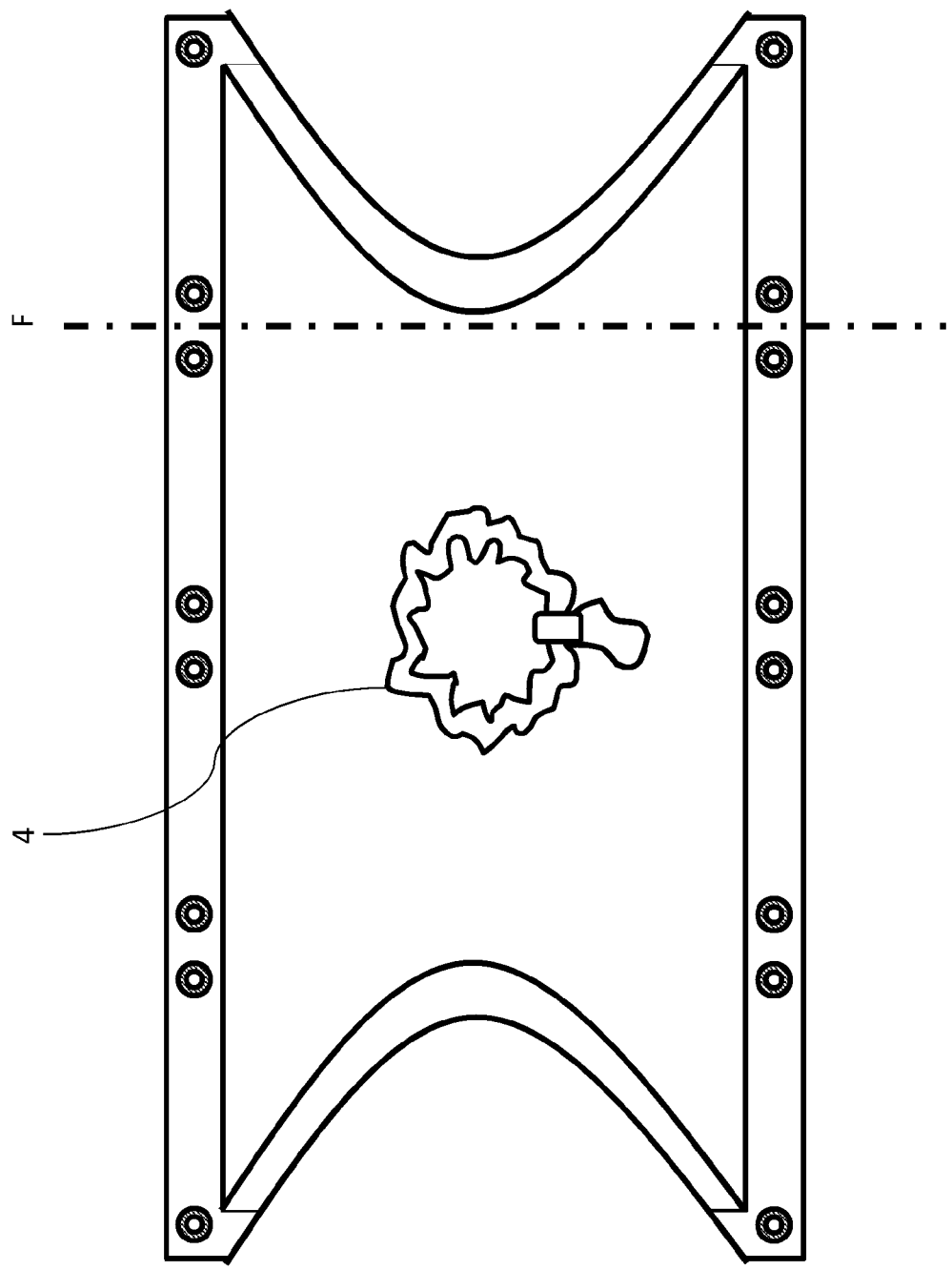
FIG. 2 depicts an hourglass-shaped barrier comprising a drawstring-adjustable opening 4. Folding along dotted line F allows perfect superpositioning of grommets, and the hourglass shape ensures that the opening 4 is not blocked by the folded material.
Figure 5:
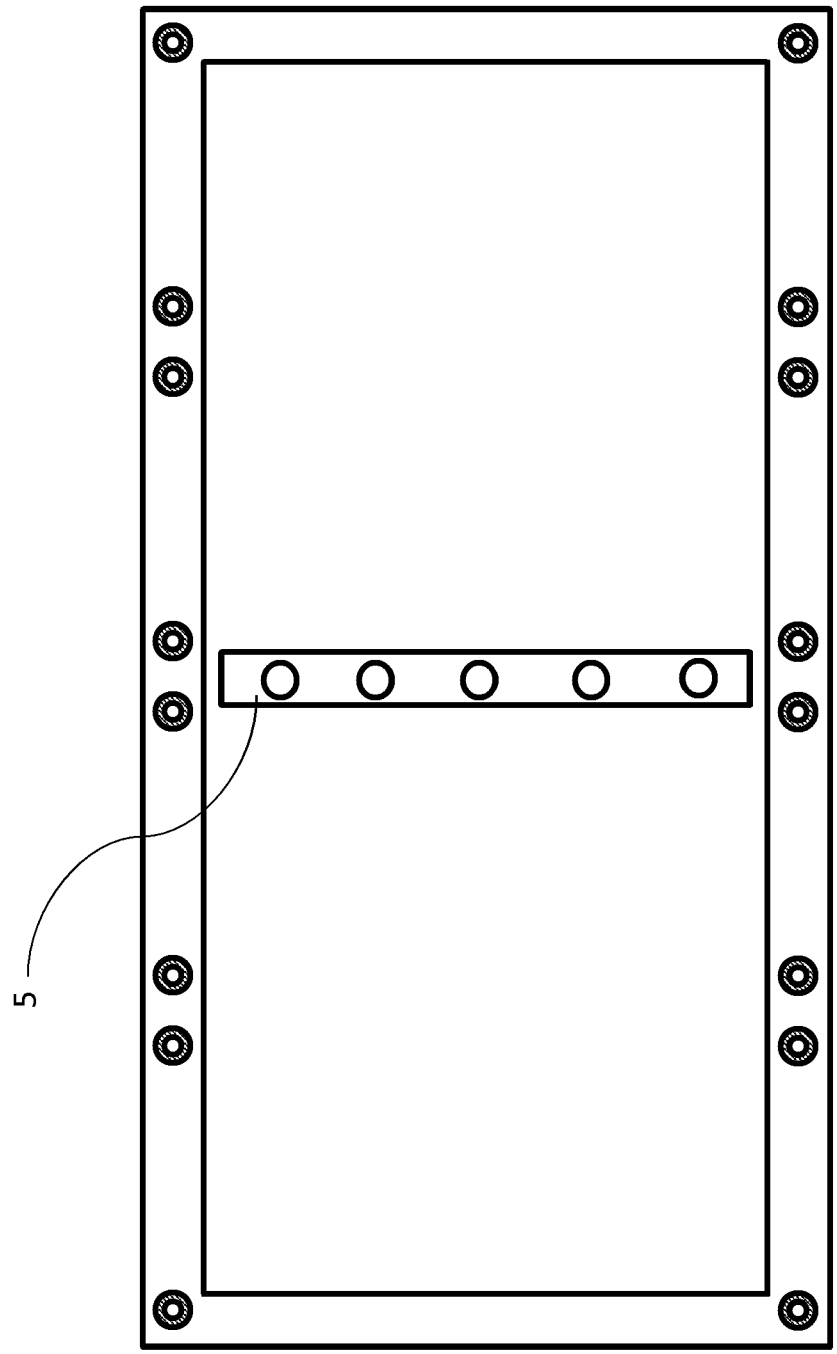
FIG. 5 illustrates a barrier comprising a buttoned slit 5. One or more buttons may be unbuttoned to form an opening of variable size within the barrier.
Figure 6:
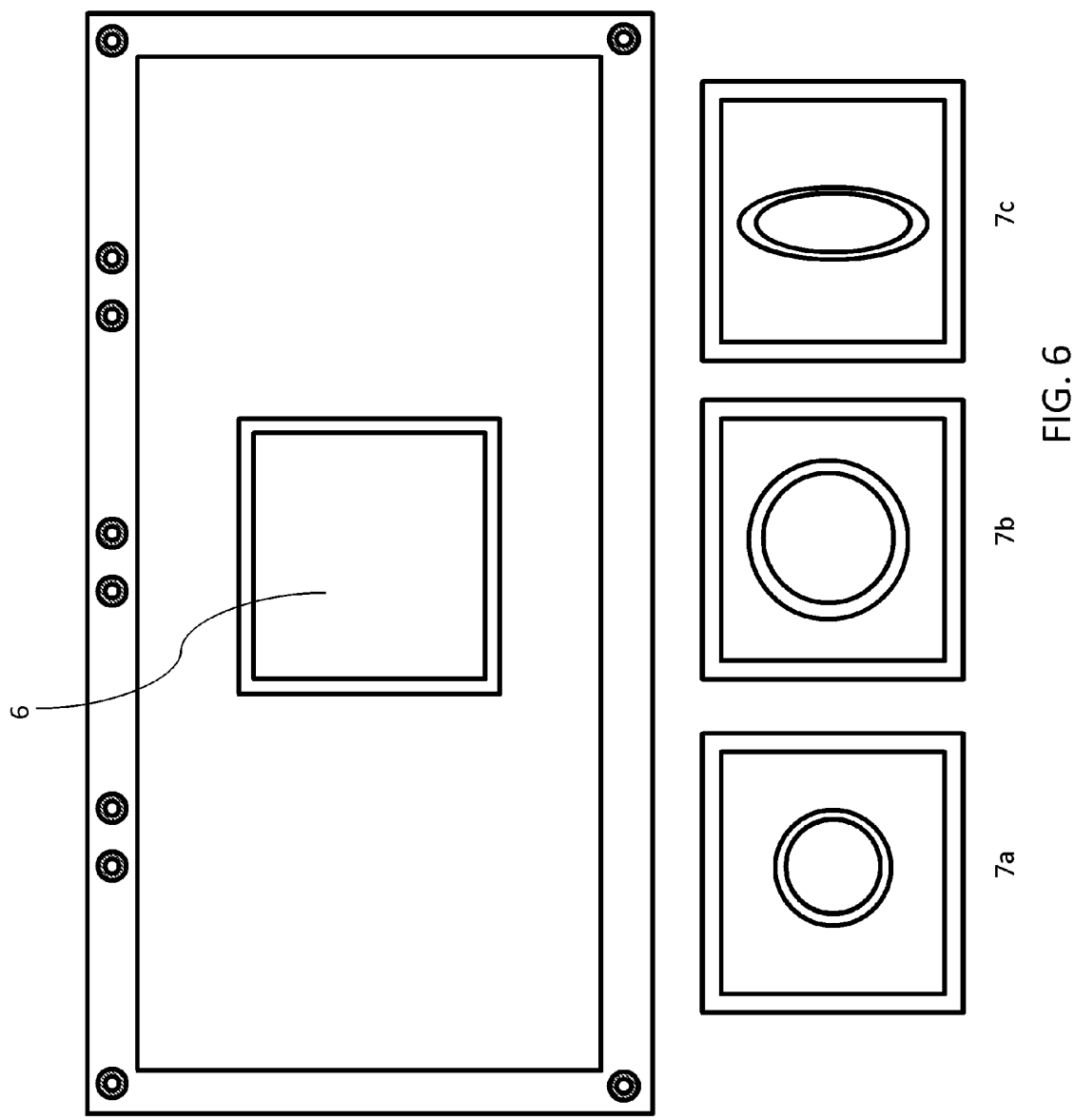
FIG. 6 illustrates a barrier comprising a large fixed opening 6 that can accept any of several adaptors 7a, 7b, and 7c to provide a desired size and shape of opening.
Figure 7A:
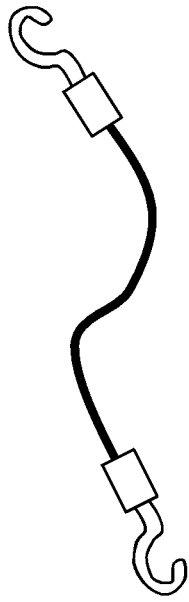
FIG. 7A shows a single cord with double hook.
Figure 7B:
FIG. 7B shows a fixed loop with single hook or ball (or other stopper).
Figure 7C:
FIG. 7C shows an adjustable loop with single hook or ball (or other stopper) that can be locked in multiple positions.
Figure 8A:
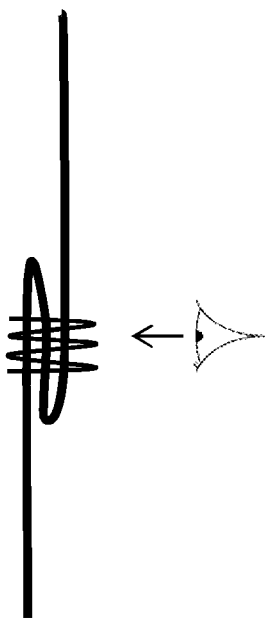
FIG. 8A shows a top view of a piece of material, webbing, or strapping folded into a Z-fold and stitched. An eye shows the direction of view for a front view.
Figure 8B:
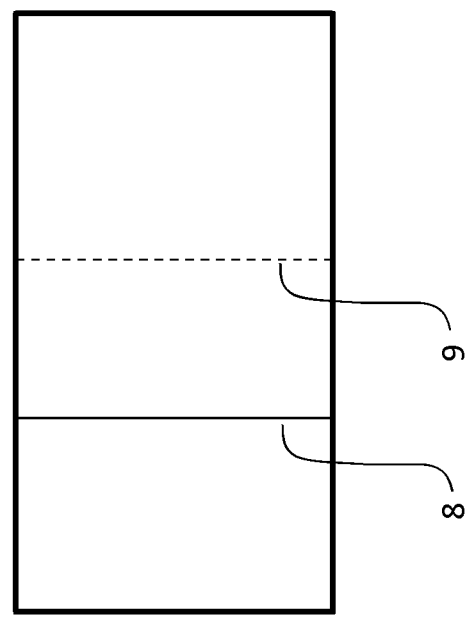
FIG. 8B provides a front view from the perspective of the eye in FIG. 8A and shows a visible pleat line 8 as well as a hidden pleat line 9 resulting from the Z-fold. (The stitching is omitted in FIG. 8B for clarity).
Figure 9:
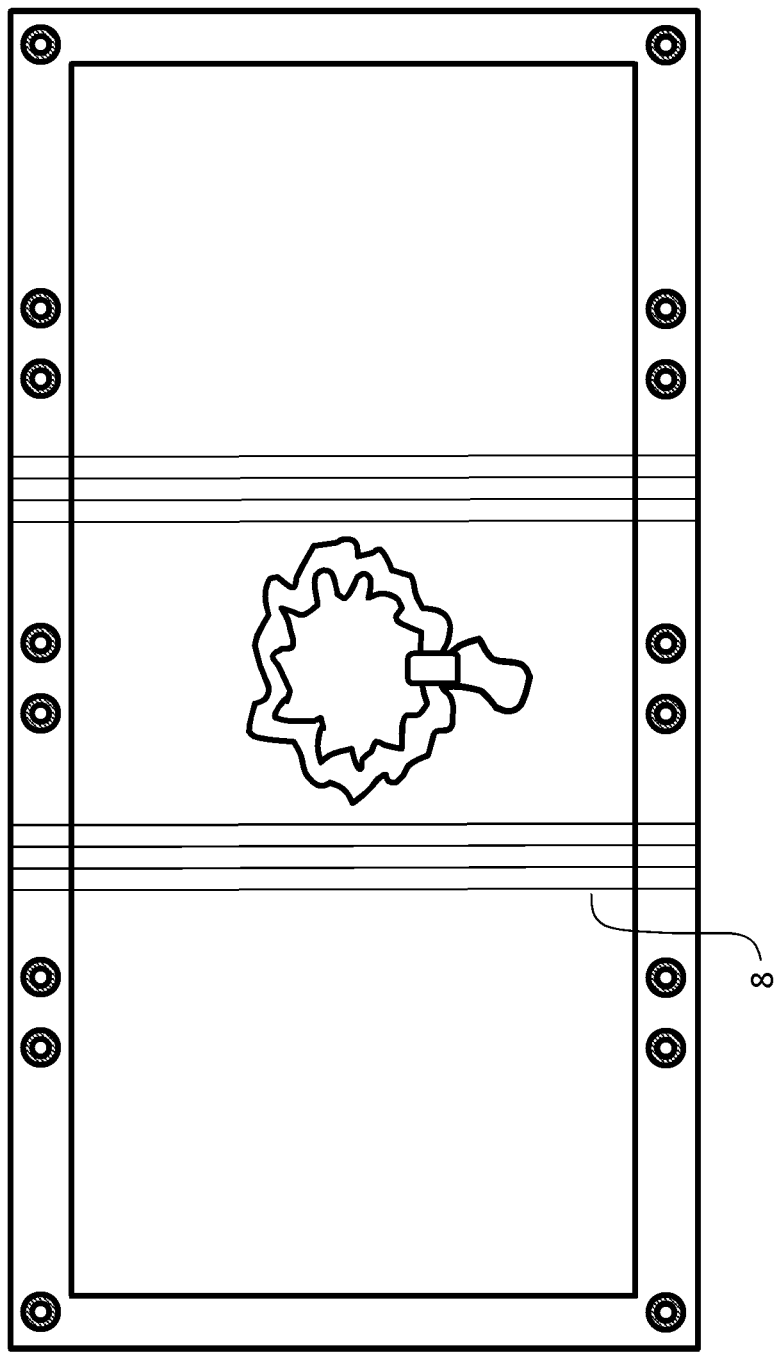
FIG. 9 illustrates an embodiment of a barrier incorporating Z-fold local failure devices in the curtain and in an optional reinforced periphery. The barrier contains a number of visible pleat lines 8 resulting from the Z-folds. (Depictions of stitching and hidden pleat lines are omitted).
Figure 10:
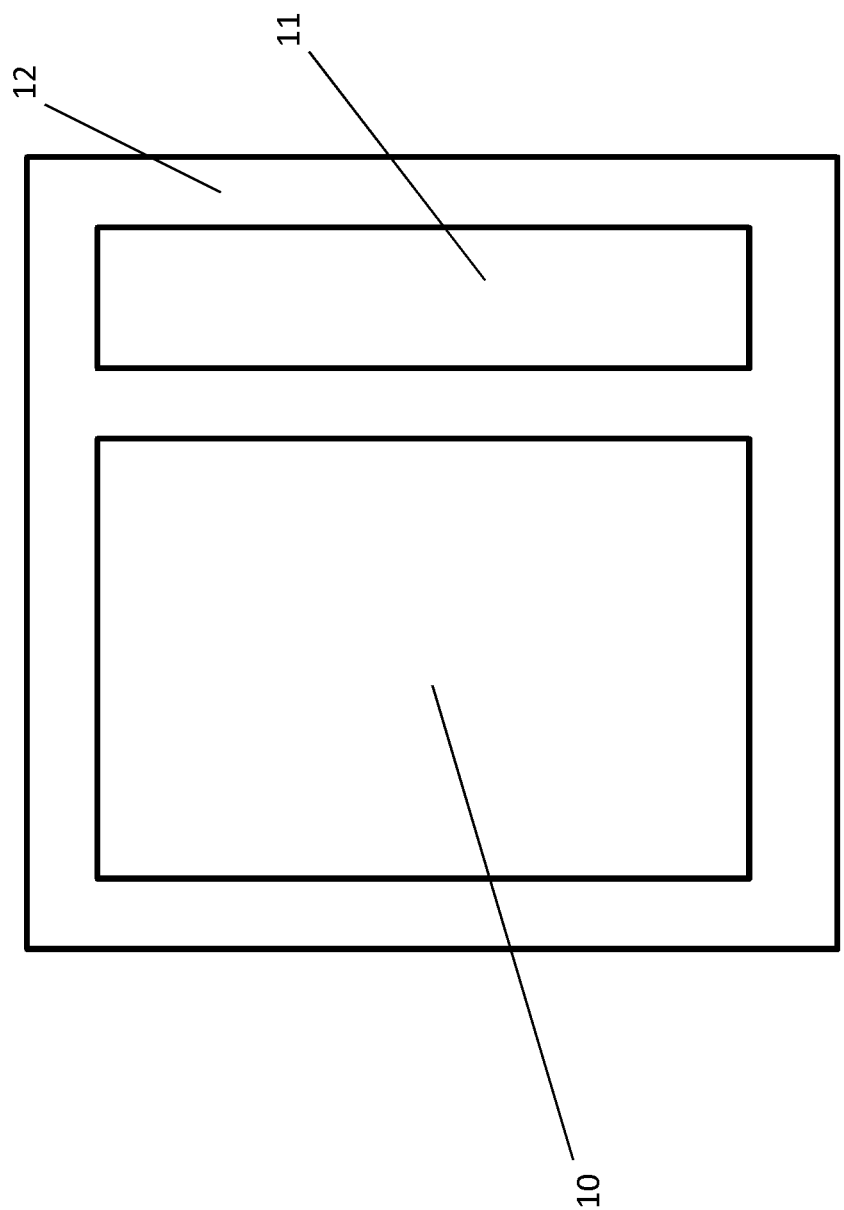
FIG. 10 schematically depicts a barrier 10 and mode(s) of attachment 11 situated in, upon, attached to, or removably associated with packaging 12. The nature of the packaging 12 and relative placement(s) and/or orientation(s) of barrier 10 and mode(s) of attachment 11 are conventional in the art and are not intended to be conveyed with specificity by this figure.

In one embodiment, shown, for example, in FIG. 1, a flexible material is utilized as an adjustable curtain. The flexible material may be mesh or solid and may be opaque, transparent, or translucent. Use of a mesh material facilitates viewing the back of the vehicle to monitor pets or other objects therein. Use of a transparent curtain material such as clear plastic (whether mesh or solid) likewise facilitates viewing the back of the vehicle. But in an alternative embodiment, the curtain can comprise an opaque material that reduces or eliminates visual contact between the front and back areas of the vehicle. Optionally, the curtain may be rigid rather than flexible.

In one embodiment, the curtain can be manufactured of molded or woven nylon, plastic, polypropylene, rayon, acetate, modacrylic, olefin, acrylic including but not limited to ORLON, polyester, carbon fiber, vinyon, PVDC including but not limited to SARAN, elastane including but not limited to SPANDEX, vinalon, aramid including but not limited to NOMEX, KEVLAR, or TWARON, MODAL, polyethylene or high performance polyethylene including but not limited to DYNEEMA or SPECTRA, PBI (polybenzimidazole fiber), polyphenylene sulfide fibers including but not limited to SULFAR, regenerated cellulose including but not limited to LYOCELL, PLA, M5, PBO or other polyoxazole including but not limited to ZYLON, aromatic polyester including but not limited to VECTRAN (TLCP fiber), DERCLON, acrylonitrile or other synthetic rubber, or other synthetic material, or combinations thereof. In an alternative embodiment, the curtain comprises natural materials, such as cotton, linen, silk, wool, sisal, hemp, latex rubber, or other woven plant or animal fibers, wood, metal, or other natural materials in any combination. Natural and synthetic materials may also optionally be used together in any combination. In one embodiment, material incorporating natural or synthetic elastic strands such as rubber strands may be used.

In a further embodiment, the periphery or edges of the curtain are joined to a reinforcement material 2. The reinforcing material may be any synthetic or natural material, including those materials indicated herein as being suitable for the curtain. In this embodiment, the periphery of the curtain is reinforced with a high strength material capable of withstanding any stretching and pulling that may be encountered when installing the barrier or in confining a pet or object to the desired area of a vehicle. In a specific embodiment, the edges of the curtain are joined to (e.g., enclosed in) a woven nylon webbing material. However, in an alternative embodiment, the edges can be reinforced by folding or rolling the edges around a reinforcing material such as cording or piping. In yet another embodiment, the edges may be reinforced by folding or rolling even without use of a distinct reinforcing material such as cording; the additional layers created by folding or rolling will themselves serve as reinforcement. A person with skill in the art would be able to determine any of a variety of additional devices and methods for reinforcing one or more edges of the curtain. Such variations are contemplated to be within the scope of the subject invention.

The barrier's curtain 1 can employ a variety of circumferential shapes and configurations suitable for the intended purpose of separating different areas of a vehicle. In one embodiment, the curtain can comprise a generally rectangular shape. However, in alternative embodiments, the curtain can utilize any of a variety of other shapes, including square, round, oval, trapezoid, triangular, quadrilateral, pentagonal, hexagonal, heptagonal, octagonal, other polygonal, or any other shape. A unique advantage of some embodiments of the barrier of the subject invention is the ability to alter the shape to separate a variety of spaces, for example by folding the barrier and/or utilizing alternative points of attachment. Thus, in a still further embodiment, the barrier can have a combination of straight and curved edges to accommodate an even broader range of uses and vehicles. In one embodiment, the barrier is shaped like an hourglass.

In an embodiment, the barrier may incorporate 1, 2, 3, 4, 5, 6, 7, 8, 9, 10, or more energy-absorbing features designed to reduce peak stresses when the barrier experiences high forces of short duration, such as during a collision. For example, if a heavy animal (or other object) were thrown into a barrier without energy-absorbing features, there would be a risk of barrier failure (and/or anchor failure). When energy-absorbing features are incorporated, the barrier itself (and/or its modes of attachment) can elongate in a controlled manner to decelerate the animal or object over a longer period of time, thus reducing the risk of barrier or anchor failure and reducing the risk of damage to the animal or object due to sudden deceleration. In one embodiment, the material of the barrier curtain can elastically elongate under load by 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200% or more without failing. In one embodiment, the modes of attachment can elastically elongate under load by 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200% or more without failing. In one embodiment, one or more local-failure elements may be used to absorb energy. For example, the curtain itself, or its optional reinforced periphery, or both, may be folded and stitched in a Z-fold or T-fold orientation (or a variation thereof) with low-strength stitching; upon heavy impact, the Z-fold or T-fold stitching will rip out partially or completely while the barrier as a whole maintains its integrity. A great variety of local-failure elements may be used including stitching; snaps, buttons, rivets, hooks, or other fasteners that disengage sequentially; and mated hook-and-loop fabric surfaces (for example in a T-fold or Z-fold).

In one embodiment, either the modes of attachment or the barrier material or both are of limited elasticity. While not required, it is especially preferred that local-failure elements be incorporated in such a case. For example, the material of the barrier curtain may optionally be able to elastically elongate under load by less than 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200% before failure. Independently, the modes of attachment may optionally be able to elastically elongate under load by less than 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200% before failure.

The barrier can be removably attached across the vehicle space by a variety of devices and methods. In one embodiment as shown in FIG. 1, one or more openings are formed within the reinforced edges of the barrier and serve as points of attachment. In a preferred embodiment, grommets 3, as known to those with skill in the art, are utilized to reinforce the openings, as shown, for example, in several of the figures. In one embodiment, openings are provided at the corners of the curtain. In another embodiment, openings are provided in the corners and at generally equidistant points along one, two, or more edges of the curtain. Openings may also be provided at non-equidistant points along one, two, or more edges of the curtain. In one embodiment, at least some of the openings are spaced at alternating longer and shorter distances. For example, a set of 10 openings along an edge could have sequential spacings of 1-inch, 10-inch, 1-inch, 10-inch, 1-inch, 10-inch, 1-inch, 10-inch, 1-inch. In one embodiment, the shorter spacing(s) are less than 80%, 70%, 60%, 50%, 40%, 30%, 20%, 10%, or 5% of the length of the adjacent longer spacing(s). In one embodiment, the shorter spacings are approximately equal, within a tolerance of ¼, ½, ¾, 1, 1.25, 1.5, 1.75, or 2 inches or less. In one embodiment, the longer spacings are approximately equal, within a tolerance of ¼, ½, ¾, 1, 1.25, 1.5, 1.75, or 2 inches or less. In one embodiment, the shorter spacings are approximately equal and are less than 0.5, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, or 10 inches, or more. In one embodiment the larger spacings are approximately equal and are about 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 15.75, 16, 16.25, 16.5, 16.75, 17, 17.25, 17.5, 17.75, 18, 18.25, 18.5, 18.75, 19, 19.25, 19.5, 19.75, 20, 20.5, 20.75, 21, 21.25, 21.5, 21.75, 22, 22.25, 22.5, 22.75, 23, 23.25, 23.5, 23.75, or 24 inches, or more.

To ensure adjustability of the curtain and allow use in either a horizontal or vertical position, it can be preferable to employ a plurality of openings within two or more edges of the curtain. Thus, in some of the embodiments shown in the figures, at least five reinforced openings are provided within each of two edges of the curtain. This can allow the entire curtain to be extended across the vehicle space. Alternatively, only a portion of the curtain can be utilized to extend across the entire space of the vehicle or only a portion of the vehicle space. In this embodiment, the curtain can be folded or draped such that the excess curtain portion remains free of attachment, or the openings in the unused curtain portion can be aligned and attached with the openings in the used curtain portion, providing a double-curtain, if desired. In an embodiment, any mechanical fastener including but not limited to snaps, hooks, pins, bolts, buttons, or other fastener, in any combination, can take the place of some or all openings to serve as points of attachment on the barrier.

In a further embodiment, one or more elastic bands (or other modes of attachment) are utilized to secure the barrier at multiple points utilizing the openings (or other points of attachment). In a specific embodiment, multiple elongated, elastic tie-downs with fixedly attached hooks at either end can be used to wrap around fixtures within the vehicle and attach both hooks to the openings in the barrier. In an alternative embodiment, elongated, elastic tie-downs with fixedly attached hooks at either end can be used to secure the curtain attaching one hooked end to an opening and the other hooked end to various features or structures within the vehicle. The use of removable elastic tie-downs can expedite adjustment of the barrier to a variety of vehicle styles and classes. However, in an alternative embodiment, multiple adjustable straps are utilized to secure the edges of the barrier. In a still further embodiment, a combination of adjustable straps and elastic tie-downs are utilized. In addition, there are a variety of types of clamps, hook styles, snap closures, or other fasteners that can be utilized with the tie-downs, adjustable straps, or similar devices, to attach to the openings in the curtain and/or vehicle features or structures. It is anticipated that a person with skill in the art would be able to devise any of a variety of devices for removably attaching to the openings and/or vehicle structures to secure the barrier's curtain across and/or within the vehicle space. Such alternatives are contemplated to be within the scope of the present invention.

As often happens with flexible materials utilized across a space, the upper-most edge can droop or sag. This is particularly prone to happen when the fabric is supported at the distal most edges or corners. Such an effect can be unsightly, but, more importantly, it can alter the effectiveness of the barrier. To reduce or eliminate this effect, the upper edge of the barrier curtain can be further supported by utilizing the front seats themselves or the headrests at the top of the front seats of most vehicles. In one embodiment, one or more elastic and/or adjustable headrest bands are utilized to affix the upper edge of the barrier curtain to one or more headrests. In a specific embodiment, the headrest band can have at least one hook (for example, a single hook) to which both ends of the elastic band is fixedly attached to form an elastic loop. The headrest band can be placed around the headrest or actual seat and at least one hook can then be utilized to attach to an opening in the upper edge of the curtain. In a second embodiment, an elongated, elastic tie-down with hooks or other attachment devices at both ends can be utilized by affixing one end to an opening, wrapping the tie-down around the headrest or seat, and affixing the other end to an opening. In a third embodiment, the headrest band can be utilized in a loop shape with a ball or knob for securing the tie-down. In a similar embodiment, where the curtain is installed behind the back seat separating the "cargo area" from the rest of the vehicle, elastic tie-downs with balls or knobs may be utilized to secure the curtain around the back seat's "headrests", although such headrests are not necessarily identical to those associated with front seats. Use of headrest bands is not limited to supporting the upper edge of the barrier curtain; in another embodiment, the lower edge of the barrier curtain may be attached to headrest bands and the barrier may be extended upward toward the roof of the vehicle.

It should be understood that tie-down assemblies and similar devices are well known in the art. A person having benefit of the subject application and knowledge in the art would be able to determine any of a variety of methods and devices (i.e., modes of attachment) for securing and/or attaching a barrier of the subject invention within a vehicle. Any and all such variations are considered to be within the spirit and scope of the subject invention. For example, modes of attachment may be flat or have a cross-sectional shape that is round, oval, rectangular, I-shaped, square, or of any other shape. Modes of attachment may comprise any type of fiber or material listed herein as appropriate for the barrier and/or optional reinforced periphery. Modes of attachment may connect to the barrier via hook(s); knob(s), ball(s), or other stopper(s); snap(s); clip(s); bolt(s); pin(s); button(s); or any other type of mechanical fastener described herein or known in the art.

In one embodiment, a barrier and one, two, three, four, five, six, seven, eight, or more individual modes of attachment are provided in, upon, attached to, or removably associated with packaging. An individual mode of attachment may be, for example, a headrest band or loop with single hook; a headrest band or loop with knob; an elongated elastic tie-down with a hook on each of its two ends; an adjustable strap with 0, 1, 2, or more hooks; or any other mode of attachment described herein. Individual modes of attachment may be provided in any combination. For example, if six individual modes of attachment are provided with packaging, the six modes could be two loops with knob and four elongated elastic tie-downs with hooks on each end.

In one embodiment, 1, 2, 3, 4, or more openings of at least 3, 4, 5, 6, 7, 8, 9, 10, 11, 12, 13, 14, 15, 16, 17, 18, 19, 20, 21, 22, 23, 24, or more inches in their largest dimension are provided within the barrier. Such openings may be selected from round, oval, square, rectangular, triangular, pentagonal, hexagonal, or any other regular or irregular shape (including a slit), in any combination. In one embodiment, at least one of the openings is partially or fully closable, and may employ zipper(s), button(s), hook(s), snap(s), hook-and-loop fabric, clip(s), drawstring(s), or any other means of closure known in the art. In one embodiment, at least one of the provided openings is adjustable in size. For example, the opening may be adjusted by partial closure via drawstring(s) or other means of closure previously mentioned. Alternatively, a large permanent opening may be provided along with attachable adaptors to reduce the opening to a desired size. For example, an opening of 3, 4, 5, 6, 7, 8, 9, 10, 11, 12, 13, 14, 15, 16, 17, 18, 19, 20, 21, 22, 23, 24, or more inches may be provided along with separate (for example, zip-in or button-in) insert(s) to reduce the opening size by 1, 2, 3, 4, 5, 6, 7, 8, 9, 10, 11, 12, or more inches. The attachable adaptor(s) may be attached by zipper(s), button(s), hook(s), snap(s), hook-and-loop fabric, clip(s), or any other means of closure known in the art. In one embodiment, the opening in the attachable adaptor is an adjustable opening, for example by drawstring(s). In one embodiment, one or more of the openings may be sized (either permanently or by adjustable mechanism) large enough to allow the head of an adult (or juvenile) animal to pass through the opening, but small enough to prevent the shoulders, body, or entire animal to pass through the opening, where the animal is a cat, dog, or other animal, for example a Dachshund, Dalmation, Rottweiler, Pekinese, Shar-Pei, Golden Retriever, Black Lab, Chihuahua, Great Dane, Irish Wolfhound, Cocker Spaniel, Portuguese Water Dog, or other recognized dog or cat breed (see, e.g., dog breeds recognized by the American Kennel Club at akc.org and cat breeds recognized by the Cat Fanciers' Association at cfa.org).

While the invention has been particularly shown and described with reference to certain specific embodiments, it will be understood by those skilled in the art that various changes in form and detail may be made therein without departing from the spirit and scope of the invention.

The following example is intended to illustrate one particular embodiment and use of the subject invention. It is not intended to be limiting in any way.

Example 1

Safety Barrier and Installation in a Full-Size SUV

The subject invention is contemplated as a barrier for installation within a vehicle with a curtain comprised of nylon mesh outlined with nylon webbing around the entire perimeter. It is rectangular in shape, and within the outlining webbing on the long sides are installed 5 metal grommets evenly spaced for attachment to the interior of the vehicle. The attachment system consists of two different types of elastic (bungee) cords: 1) single loop cord with hook (or with ball, knob, or other stopper) and 2) single cord with double hook. Two single loop cords with hooks (or with ball, knob, or other stopper) are intended to secure around the driver's and passenger's headrests or actual seats. Four single cords with double hooks are intended to secure in one of two ways, either from grommet to anchor, or from grommet, looping (or curving) around anchor and back to grommet. A single cord with double hook that extends from grommet to anchor and back to grommet may return to the same grommet, an adjacent grommet, or a more distal grommet. Four examples of anchors are: 1) the housing for the seatbelt mechanism (for the front seats) where it joins the wall of the vehicle at approximately head height; 2) the handle common in many vehicles located next to the backseat windows and near the housing for the seatbelt mechanism (for the front seats) where it joins the wall of the vehicle at approximately head height; 3) the housing for the seatbelt mechanism (for the front seats) where it joins the floor of the vehicle on the side of each front seat next to the door; 4) the housing for the seatbelt mechanism (for the front seats) where it joins the floor of the vehicle between the two front seats.

ADDITIONAL EMBODIMENTS

1. A barrier comprising a curtain, wherein said curtain comprises a periphery and a plurality of points of attachment situated in said periphery.
2. The barrier of embodiment 1, wherein said periphery is reinforced.
3. The barrier of embodiment 2, wherein said periphery is reinforced with webbing, cording, or piping.
4. The barrier of any preceding embodiment, wherein at least one of the points of attachment is an opening.
5. The barrier of embodiment 4, wherein the opening is reinforced with a grommet.
6. The barrier of any preceding embodiment, further comprising at least one mode of attachment, wherein said mode of attachment is an elongated elastic tie-down or a strap.
7. The barrier of embodiment 6, wherein said at least one mode of attachment is a bungee or elastic band or cord in the form of a loop attached to a single hook, ball, or knob.
8. The barrier of any preceding embodiment, wherein said curtain is flexible.
9. The barrier of any preceding embodiment, wherein said curtain is mesh or opaque.
10. The barrier of any preceding embodiment, wherein said curtain comprises nylon, plastic, polypropylene, cotton, plant fibers, wood, metal, or combinations thereof
11. The barrier of any preceding embodiment, wherein said curtain is rectangular, square, round, oval, or trapezoid.
12. The barrier of any preceding embodiment, wherein said plurality of points of attachment situated in said periphery comprise openings at the corners and at approximately equidistant points along two or more edges.
13. The barrier of any preceding embodiment except 12, wherein said plurality of points of attachment situated in said periphery comprise openings at the corners and at alternating long and short spacings along two or more edges.
14. The barrier of any preceding embodiment, wherein the size of said curtain in its shortest dimension is less than 6, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or more than 40 inches.
15. The barrier of any preceding embodiment, wherein the size of said curtain in its longest dimension is less than 12, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, or more than 60 inches.
16. The barrier of any preceding embodiment, wherein said curtain is mesh and the mesh is less than 1/8, 1/8, 1/4, 3/8, 1/2, 5/8, 3/4, 7/8, 1, 1 1/8, 1 1/4, 1 3/8, 1 1/2, 1 5/8, 1 3/4, 1 7/8, or 2 or more inches, wherein the mesh size refers to the size of a ball that would fall through the mesh if placed on the mesh.
17. The barrier of any preceding embodiment, wherein the periphery is reinforced with webbing having a width of less than 1/4, 1/4, 3/8, 1/2, 5/8, 3/4, 7/8, 1, 1 1/8, 1 1/4, 1 3/8, 1 1/2, 1 5/8, 1 3/4, 1 7/8, or 2 or more inches.
18. The barrier of embodiment 5, wherein said grommet has an opening of less than 1/8, 1/8, 1/4, 3/8, 1/2, 5/8, 3/4, 7/8, 1, 1 1/8, 1 1/4, 1 3/8, 1 1/2, 1 5/8, 1 3/4, 1 7/8, or 2 or more inches.
19. The barrier of any preceding embodiment, wherein said barrier comprises 1, 2, 3, 4, 5, 6, 7, 8, 9, 10, or more local-failure elements.
20. The barrier of any preceding embodiment, wherein said barrier comprises 1, 2, 3, 4, or more openings of at least 3, 4, 5, 6, 7, 8, 9, 10, 11, 12, 13, 14, 15, 16, 17, 18, 19, 20, 21, 22, 23, 24, or more inches in their largest dimension when opened fully.

21. The barrier of any preceding embodiment, wherein the barrier is approximately oval or rectangular and is about 24 by 47 inches.

22. The barrier of any preceding embodiment, wherein the barrier is approximately oval or rectangular and is about 34 by 47 inches.

What is claimed is:

1. A barrier comprising a curtain in the shape of a rectangle having four corners, each said corner including a respective single grommet, and said barrier further comprising additional grommets at alternating long and short spacings along the entirety of either or both pairs of opposite sides of said rectangle, wherein for each side of said rectangle that has said additional grommets at alternating long and short spacings along the entirety of the side, there is a long spacing between each single corner grommet and the next adjacent additional grommet.

2. The barrier of claim 1, wherein there are at least 4 long spacings and 3 short spacings on each of said either or both pairs of opposite sides having said additional grommets at alternating long and short spacings.

3. The barrier of claim 2, wherein said short spacings are of an approximately uniform size and said approximately uniform size for short spacings is 4 inches or less.

4. The barrier of claim 2, wherein said long spacings are of an approximately uniform size and said approximately uniform size for long spacings is 8 inches or more.

5. The barrier of claim 2, wherein said short spacings are of an approximately uniform size and said approximately uniform size for short spacings is 4 inches or less, and wherein said long spacings are of an approximately uniform size and said approximately uniform size for long spacings is 8 inches or more.

6. The barrier of claim 5, wherein said short spacings are about 2-3 inches in length and said long spacings are about 8-10 inches in length.

7. The barrier of claim 5, wherein said short spacings are about 1-2 inches in length and said long spacings are about 9-11 inches in length.

8. The barrier of claim 1, wherein the curtain is flexible mesh and the edges of the curtain are reinforced with nylon webbing.

* * * * *